US 11,714,272 B2

(12) United States Patent
Harig et al.

(10) Patent No.: US 11,714,272 B2
(45) Date of Patent: Aug. 1, 2023

(54) IR MICROSCOPE

(71) Applicant: Bruker Optik GmbH, Ettlingen (DE)

(72) Inventors: Roland Harig, Waldbronn (DE);
Stephan Luettjohann, Karlsruhe (DE)

(73) Assignee: BRUKER OPTICS GMBH & CO. KG, Ettlingen (DE)

( * ) Notice: Subject to any disclaimer, the term of this patent is extended or adjusted under 35 U.S.C. 154(b) by 129 days.

(21) Appl. No.: 16/815,531

(22) Filed: Mar. 11, 2020

(65) Prior Publication Data
US 2020/0292803 A1    Sep. 17, 2020

(30) Foreign Application Priority Data

Mar. 15, 2019   (DE) ............... 10 2019 203 560.4

(51) Int. Cl.
| G02B 21/00 | (2006.01) |
| G02B 21/08 | (2006.01) |
| G02B 21/36 | (2006.01) |

(52) U.S. Cl.
CPC ......... *G02B 21/088* (2013.01); *G02B 21/361* (2013.01)

(58) Field of Classification Search
CPC .... G02B 21/00; G02B 21/0032; G02B 21/02; G02B 21/06; G02B 21/088; G02B 21/241; G02B 21/36; G02B 21/361
USPC .................................................. 359/368–390
See application file for complete search history.

(56) References Cited

U.S. PATENT DOCUMENTS

| 3,748,015 A | 7/1973 | Offner |
| 4,843,242 A * | 6/1989 | Doyle ............... G02B 5/005 250/341.8 |
| 5,512,749 A | 4/1996 | Iddan et al. |
| 5,713,364 A * | 2/1998 | DeBaryshe ...... G01N 21/4795 600/407 |

(Continued)

FOREIGN PATENT DOCUMENTS

| CN | 101952762 A | 1/2011 |
| CN | 105849616 A | 8/2016 |

(Continued)

OTHER PUBLICATIONS

"Hyperion Series: FTIR Microscopes", Bruker Optik GmbH, 2013, 8 pages.

(Continued)

*Primary Examiner* — Thong Q Nguyen
(74) *Attorney, Agent, or Firm* — Edell, Shapiro & Finnan, LLC

(57) ABSTRACT

An IR microscope includes an IR light source/interferometer (1) generating a collimated IR beam (26), an effectively beam-limiting element (8) in a stop plane (27), a sample position (15), a detector (19) having an IR sensor (19a), a detector stop (19b), a first optical device focusing the collimated IR beam onto the sample position, and a second optical device imaging the sample position onto the IR sensor. The effectively beam-limiting element is situated in the collimated IR beam. The first and second optical devices image the detector stop opening into an input beam plane.

(Continued)

For the area A1 of the image of the detector stop opening in the input beam plane and the area A2 of the cross section of the collimated IR beam in the input beam plane: $0<A1/A2\leq1$. Thereby, only collimated IR radiation is picked up, while vignetting and stray radiation are avoided.

12 Claims, 9 Drawing Sheets

(56) References Cited

U.S. PATENT DOCUMENTS

| | | | |
|---|---|---|---|
| 5,864,139 A | 1/1999 | Reffner et al. | |
| 5,923,422 A | 7/1999 | Keens et al. | |
| 6,825,978 B2 | 11/2004 | Khurana et al. | |
| 7,378,657 B2 | 5/2008 | Hoult et al. | |
| 7,440,095 B2 | 10/2008 | Deck | |
| 8,427,752 B2 * | 4/2013 | Dohi | G02B 21/086 |
| | | | 359/642 |
| 9,377,612 B2 | 6/2016 | Juette et al. | |
| 9,523,845 B2 | 12/2016 | Fletcher et al. | |
| 9,726,877 B2 | 8/2017 | Kleppe et al. | |
| 10,175,263 B2 | 1/2019 | Meyer et al. | |
| 10,330,904 B2 | 6/2019 | Kapanidis et al. | |
| 2013/0188034 A1 | 7/2013 | Juette et al. | |
| 2014/0104681 A1 | 4/2014 | Berman | |
| 2014/0340482 A1 | 11/2014 | Kanarowski | |
| 2015/0153232 A1 * | 6/2015 | Xiao | G02B 21/361 |
| | | | 250/349 |
| 2015/0362715 A1 | 12/2015 | Kubo | |
| 2018/0119782 A1 * | 5/2018 | Maji et al. | G02B 21/0004 |
| 2018/0307018 A1 * | 10/2018 | Aizawa | G02B 21/006 |

FOREIGN PATENT DOCUMENTS

| | | |
|---|---|---|
| CN | 107850620 A | 3/2018 |
| CN | 207114870 U | 3/2018 |
| DE | 2230002 C2 | 11/1984 |
| DE | 19704598 C2 | 6/1998 |
| DE | 102011084315 A1 | 4/2013 |
| DE | 102012200851 B3 | 7/2013 |
| EP | 1184703 B1 | 3/2002 |
| JP | H0341328 A | 2/1991 |
| JP | H07198596 A | 8/1995 |
| JP | 2005523428 A | 8/2005 |
| JP | 2010502957 A | 1/2010 |
| JP | 2017009718 A | 1/2017 |
| WO | 03085958 A1 | 10/2003 |

OTHER PUBLICATIONS

Offner "New Concepts in Projection Mask Aligners", Optical Engineering, vol. 14 No. 2, Apr. 1, 1975, 3 pages.

"Adjusting Kohler's illumination on the microscope", Christian Linkenheld, 2001, http://www.mikroskopie.de/kurse/koehlerpraxis.htm, 4 pages.

"Numerical aperture and resolution", Christian Linkenheld, 2000, http://www.mikroskopie.de/kurse/apertur.htm, 6 pages.

* cited by examiner

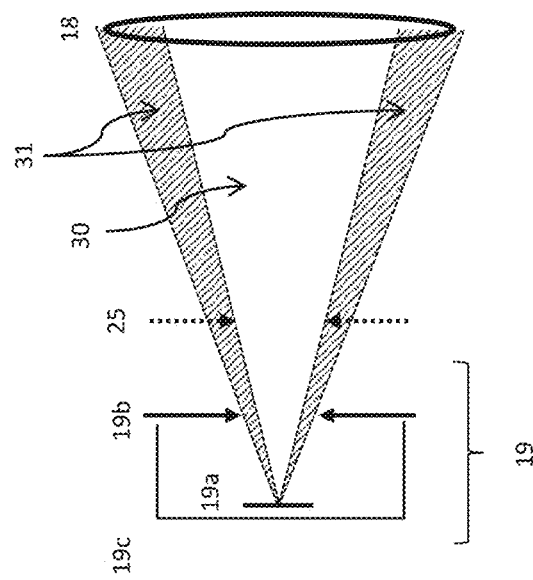
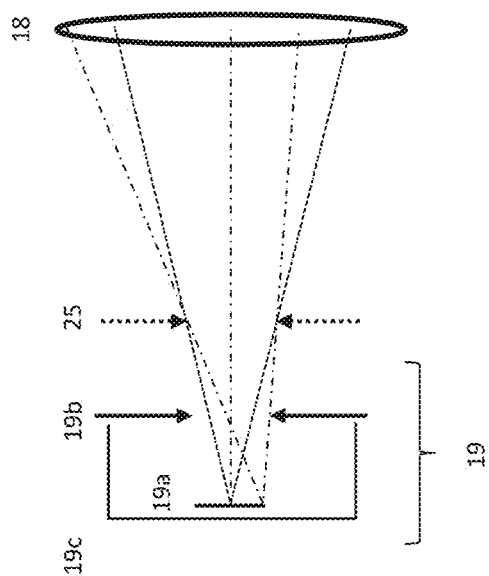
Fig. 2D
Fig. 2C

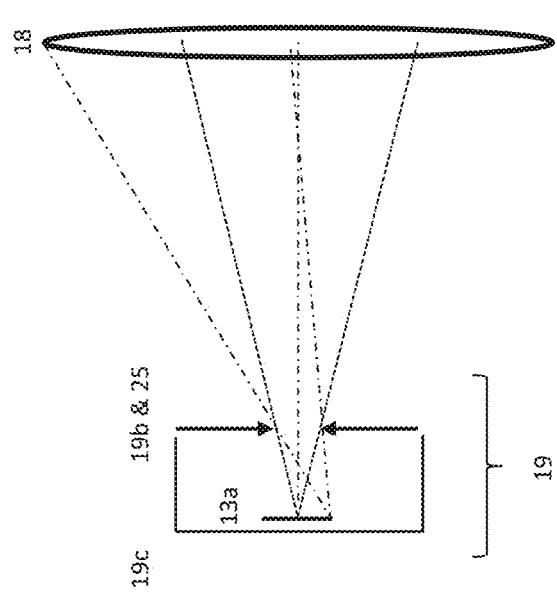

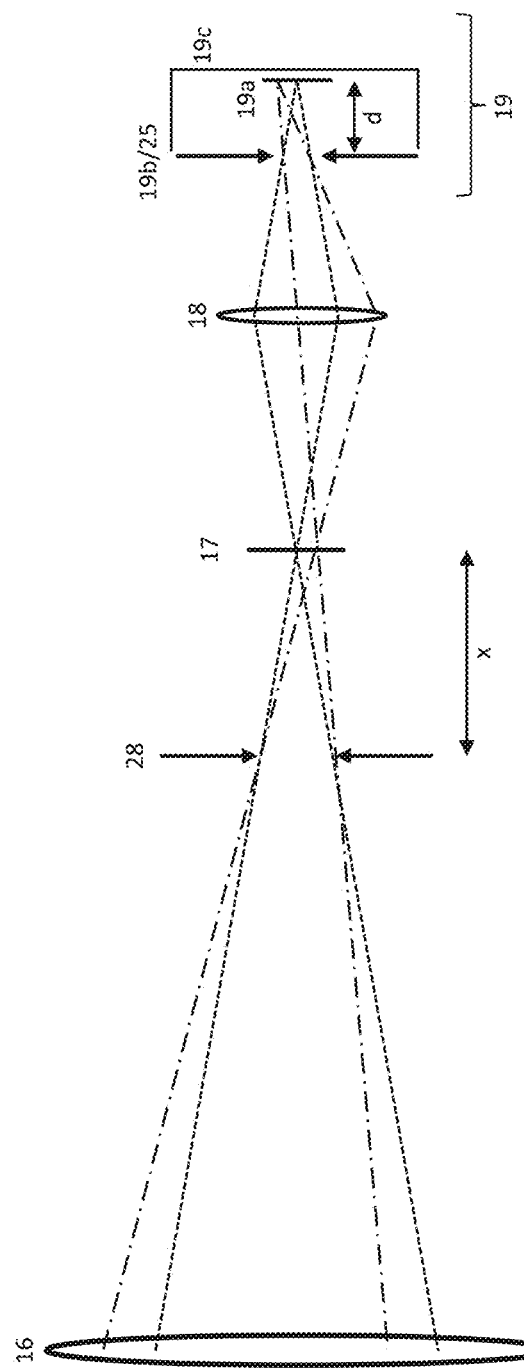

IR MICROSCOPE

CROSS REFERENCE TO RELATED APPLICATIONS

This application claims foreign priority under 35 U.S.C. § 119(a)-(d) to German Application No. 10 2019 203 560.4 filed on Mar. 15, 2019, the entire contents of which are hereby incorporated into the present application by reference.

FIELD OF THE INVENTION

The invention relates to an IR microscope comprising an IR light source configured to generate a collimated IR input beam, an effectively beam-limiting element in a stop plane in the collimated IR input beam, a sample position for supporting a sample, an IR detector having an IR sensor, a detector stop having a detector stop opening, said detector stop being arranged upstream of the IR sensor, a first optical device configured to focus the collimated IR input beam emerging from the IR light source onto the sample position, and a second optical device configured to image the sample position onto the IR sensor, wherein the second optical device comprises an objective and an intermediate optical unit.
IR microscopes of this type are known for example from [1], [2], [3], [4].

BACKGROUND

Infrared (IR) microscopes can generate IR images and visual images of a sample to be examined, wherein the measurements can typically be carried out both in transmission and in reflection. For this purpose, the beam paths for infrared and visible light can be switched between transmission and reflection.

The IR microscopes under consideration here make it possible, in particular, to spectrally measure microscopic samples in a spatially resolved manner, i.e. a spectrum in the infrared spectral range is obtained for different regions on the microscopic sample.

For this purpose, the IR light passes through an interferometer, in which the lengths of the interferometer arms are varied with respect to one another by moving one or more mirrors and, as a result, the infrared light is modulated depending on its wavelength. In this case, the modulation frequency is dependent on the wavelength, wherein each wavelength can be uniquely assigned to a modulation frequency. The infrared light thus modulated is guided onto a sample to be examined and the light emanating from the sample is focused onto an infrared detector by way of a second optical device.

The modulated light received by the detector contains all spectral information of the sample. However, the detector is also sensitive to IR light from the surroundings, which is not modulated. If this light reaches the detector, it does not contribute to the information gain, but it does reduce the dynamic range of the detector.

Added to this there is a further portion of undesired detector signal, the dark current. The detector is therefore generally cooled in order to minimize undesired signals that can be caused by thermal excitations in the sensor material. The detector is intended to yield, where possible, only signals that are generated by the modulated IR radiation coming from the sample.

In order to suppress radiation from the surroundings as much as possible, the detector contains a detector stop.

In the prior art the size and position of the detector stop is always determined by way of the last imaging optical unit upstream of the detector. In this regard, in [3], for example, the detector stop is dimensioned such that only radiation from the upstream intermediate optical unit can pass through the detector stop.

With the use of a cooled IR sensor surrounded by a cooled housing (radiation shield), such that light passes to the sensor only through the likewise cooled detector stop (cold stop), the position and size of the detector stop cannot be dimensioned arbitrarily, however, since it has to be installed within a Dewar vessel. The position and size of the detector stop thus generally cannot be optimally adapted to the upstream intermediate optical unit, rather the upstream intermediate optical unit has to be designed such that the radiation desired for the measurement passes through the detector stop, but undesired radiation (e.g. radiation from the surroundings) cannot pass through the detector stop. For this purpose, the intermediate optical unit directs the IR radiation in a cone with half the opening angle $\alpha/2$ in the direction of the detector and generates an image of the sample plane or of downstream intermediate image planes of the sample plane on the IR sensor. The ratio of the diameter of the input aperture to the distance d between the detector stop and the IR sensor thus corresponds to the F-number (F/#) of the intermediate optical unit. This procedure is entirely suitable for single-element detectors, such as are used e.g. in [4]. This procedure is not sufficient, however, for extensive 1- or 2-dimensional detectors having a multiplicity of sensor elements, such as are used e.g. in [1] and [3]: although the cooled input aperture can be set well for the central pixel on the sensor, infrared radiation leading to pixels that do not lie centrally on the sensor, in particular at the edge regions, is vignetted by the detector stop. If only the detector stop is enlarged in order to reduce the vignetting, then stray light, in particular radiation from the uncooled surroundings, which does not contain a measurement signal, also reaches the sensor of the infrared detector and corrupts the measurements.

[1] discloses an IR microscope comprising a multi-element detector, in which the detector stop is imaged onto a mirror of the Cassegrain objective of the second optical device. In this case, the mirror of the Cassegrain objective forms the beam-limiting element of the apparatus. On account of the beam limiting by the mirror of the second optical device, however, stray radiation occurs at the edges of the mirror, which adversely influences the quality of the measurement.

SUMMARY

It is an object of the invention to provide an IR microscope comprising a multi-element IR detector in which all sensor elements (pixels) of the IR detector pick up only modulated infrared radiation that comes from a collimated IR source and illuminates a user-defined region in the sample plane. It is a further object of the invention to provide an IR microscope that avoids disturbing effects such as vignetting and stray radiation.

Description of the Invention

According to one formulation of the invention, the effectively beam-limiting element is situated in the collimated IR input beam prior to entry into the first optical device. The first optical device and the second optical device image the detector stop opening of the detector stop into an input beam plane, wherein the following holds true for the area A1 of the image of the detector stop opening in the input beam plane and the area A2 of the cross section of the collimated IR input beam in the input beam plane:

$$0 < A1/A2 \leq 1.$$

An element is "effectively beam-limiting" if within the device no further element exists which limits the cross section of the IR beam to a greater extent than the effectively beam-limiting element. The effectively beam-limiting element defines the stop plane (perpendicular to the optical axis of the IR radiation). The stop plane is thus situated at the location of the beam limiting by the effectively beam-limiting element, e.g. at the location of an effectively beam-limiting stop or an effectively beam-limiting mirror.

The light from the IR light source prior to entry into the first optical device is designated as IR input beam. In the region in which the IR input beam is collimated, it preferably has a divergence of less than 2°.

The limitation according to the invention of the ratio of detector stop opening and cross section of the IR input beam in the input beam plane prevents light from the external regions (e.g. on account of thermal radiation from the surroundings) from passing into the detector. It is thus ensured that exclusively infrared light which leaves the beam-limiting element and illuminates a defined region in the sample plane reaches the detector and all pixels on the detector are illuminated equally, without vignetting. In this case, the indication $A1/A2 \leq 1$ should be understood to mean that small deviations therefrom that do not significantly impair the result of the measurement are concomitantly encompassed under this condition. The measurement is significantly impaired for example if the useful signal available for the measurement were to fall to below 70% of the useful signal with the optimum setting. In this case, the measurement time would already have to be at least doubled in order to obtain a comparable signal-to-noise ratio (70%×sqrt(2)=99%) compared with the optimum setting.

With the use of conventional IR radiation sources, an IR microscope in which A1/A2=1 holds true is preferably used. This firstly prevents ambient light from passing into the detector, and secondly ensures a maximum luminous efficiency. This is the optimum setting if the detector is not saturated by the radiation source. However, it may also be advantageous to provide a ratio of A1/A2<1, particularly if a radiation source of very high light intensity (e.g. QC laser) is used, since, in the event of an excessively large detector stop opening being used, there is a risk of the detector being operated in saturation. Furthermore, the invention provides for the effectively beam-limiting element and also the input beam plane to be situated in the collimated IR input beam (that is to say prior to entry into the first optical device). The relevant beam cross section to be imaged onto the detector stop is thus not defined by the intermediate optical unit, but rather already upstream of the first optical device. By virtue of the fact that the beam-limiting element is situated in the collimated input beam, that is to say within a beam having only a very low divergence, there is a certain flexibility concerning the position of the input beam plane onto which the detector stop is imaged relative to the effectively beam-limiting element. Furthermore, by virtue of the fact that the effectively beam-limiting element is situated in the collimated input beam, the influence of stray effects occurring at the edges of the effectively beam-limiting element will be minimized.

DESCRIPTION OF EXEMPLARY EMBODIMENTS

Preferably, the input beam plane is situated in the effectively limited input beam, that is to say in the stop plane or between stop plane and first optical device.

If the microscope is intended to be used in transmission, the first optical device comprises a further objective (condenser) for focusing the IR input beam onto the sample position. That is to say that the objective for focusing the IR input beam onto the sample position is not the same objective as the one for imaging the sample position after the irradiation of the sample.

For using the IR microscope in reflection, the first optical device comprises the objective configured to focus the IR input beam onto the sample position, and a beam splitter optical unit configured to couple the IR input beam emanating from the IR light source into the objective. In this case, the objective serves both for focusing the IR input beam onto the sample and for generating an intermediate image with the radiation reflected from the sample. In this case, the objective for focusing the IR input beam onto the sample position can be the same objective as the one for imaging the sample position after the irradiation of the sample.

In the simplest case, the first optical device can be an infinite-corrected objective. If the objective used is a finite-corrected objective, the first optical device furthermore comprises mirrors that image the collimated input beam onto an intermediate focus, which is then imaged onto the sample by the finite-corrected objective.

Both objectives can be mirror objectives, refractive objectives or catadioptric objectives. Preferably, the objectives are embodied as Cassegrain objectives comprising two spherical mirrors.

The detector is preferably a 2-dimensional detector having a multiplicity of detector elements (pixels) in a sensor plane. Alternatively, a linear array detector can also be used, in which the detector elements are arranged along a straight line.

In one particularly preferred embodiment of the IR microscope according to the invention, the detector stop and the IR sensor are situated within a common detector housing and are arranged at a distance d away from one another, wherein the distance d is preferably a maximum of 50 mm. The imaging of the sample and of the input beam plane is then effected according to the invention such that the distance between the image of the sample that is generated by the intermediate optical unit and the image of the input beam plane that is generated by the intermediate optical unit comprises a distance d.

The intermediate optical unit has an effective focal length f for which the following preferably holds true:

$$f = \frac{d \cdot x}{x \cdot m - d/m}$$

where f: effective focal length of the intermediate optical unit x: distance between the image of the input beam plane that is created by the first optical device and by the objective of the second optical device and the image of the sample that is created by the objective of the second optical device d: distance between detector stop (19*b*) and IR sensor (19*a*)

m: magnification factor of the intermediate optical unit.

The intermediate optical unit can comprise a plurality of imaging optical elements, in particular mirrors, which together have the effective focal length f.

The distance d between detector stop and IR sensor is preferably chosen as large as possible, however, the distance d is limited by the space available for the arrangement. Since the detector stop/cold stop is preferably arranged in an evacuated dewar vessel, the distance d is limited by the dimensions of the evacuated dewar vessel. The distance d between detector stop and IR sensor is therefore preferably between 2 mm and 50 mm, in particular between 15 mm and 35 mm.

The magnification factor m is dependent on the desired total magnification of the objective of second optical device and the intermediate optical unit, the lateral resolution of the objective of the second optical device and the pixel size of the sensor elements. Preferably, the magnification factor m is selected in the range between 0.1 and 10.

The first optical device is configured so that the IR radiation is focused on the sample position. The objective is configured to generate an image of the sample in the intermediate image plane. The first optical device and the objective designed in this way together also produce an image of the input beam plane behind the objective. The image of the input beam plane behind the objective and the image of the sample behind the objective have a distance x to each other. Typically, the distance x is between 1 mm and 250 mm, especially 70 mm.

What is achieved by choosing the effective focal length according to the invention is that an intermediate image plane is imaged with a magnification m onto the sensor plane, and the input beam plane is simultaneously imaged onto the detector stop. The magnification m makes it possible to adapt the size of the image of the sample on the detector. The size of the image of the input beam plane at the location of the detector stop is thus influenced as well. The size of the detector stop is then adapted to the size of the image of the input beam plane at the location of the detector stop.

Ideally, both the detector and the detector stop are cooled in order to minimize thermal radiation from surfaces onto the detector. The IR sensor and the detector stop are then preferably accommodated in a cooled detector housing, which provides for a great reduction of infrared light which does not come from the interferometer and from the sample. In the case of such joint accommodation of the IR sensor and the detector stop in a detector housing, a corresponding adaptation of the imaging ratios by the intermediate optical unit is necessary since the distance between detector stop and detector housing cannot be chosen to be arbitrarily large.

In one specific embodiment of the IR microscope according to the invention, the magnification factor m of the intermediate optical unit is 1. The intermediate optical unit thus brings about a 1:1 imaging (2$f$ imaging).

One preferred embodiment of the IR microscope according to the invention provides for the effectively beam-limiting element to be an output aperture of the IR light source. The input beam plane is then preferably chosen at the output, that is to say in the vicinity of the output aperture of the IR light source, e.g. at the exit pupil of a Michelson interferometer.

In another embodiment, the effectively beam-limiting element and the input beam plane are arranged within the IR light source. The effectively beam-limiting element can be e.g. a stop or mirror within an interferometer which serves as IR light source. In particular, the input beam plane can lie between input and output openings of an interferometer.

In one preferred embodiment, the input beam plane is the stop plane. The detector stop opening is thus imaged in the stop plane. As a result, a simple adaptation of the detector stop, the intermediate optical unit and the beam-limiting element to one another can be effected since this can be effected independently of any divergence of the collimated input beam that is possibly present.

The intermediate optical unit can comprise an Offner objective, for example. An Offner objective comprises two spherical mirrors, which produce an astigmatism-free imaging of the sample and of the input beam plane within the intermediate optical unit. The intermediate optical unit can comprise further spherical mirrors, aspherical mirrors or toroidal mirrors in addition to the Offner objective. In particular, the image generated by the Offner objective can be imaged onto the detector or the detector stop by an aspherical mirror or toroidal mirror; or the image generated by an aspherical mirror or toroidal mirror can be imaged onto the detector or the detector stop by the Offner objective. A combination with refractive optical elements (lenses) is likewise conceivable.

The IR light source of the IR microscope according to the invention can comprise an interferometer, a quantum cascade laser (in this case the IR radiation source is identical to the IR light source) or a Fourier-transform infrared (FTIR) spectrometer.

Further advantages of the invention are evident from the description and the drawing. Likewise, the features mentioned above and the features that will be described further below can be used according to the invention either individually by themselves or as a plurality in any desired combination of the features. The embodiments shown and described should not be understood as an exhaustive enumeration, but rather are of exemplary character for outlining the invention.

BRIEF DESCRIPTION OF THE INVENTION AND DRAWING

FIG. 2C shows the reduction of the vignetting of the edge pixels such as was illustrated in FIG. 2B, by the enlargement of the detector stop 19*b* with increased ambient light being accepted.

FIG. 2D shows, for the arrangement from FIG. 2C, the radiation cone of the IR radiation from the radiation source and a radiation cone of the disturbing radiation from the surroundings.

FIG. 2E shows beam paths of the IR radiation between the intermediate optical unit and a central and respectively an outer sensor element of the IR sensor of the IR microscope, wherein the beam-limiting element is imaged at the location of the detector stop opening and A1=A2.

FIG. 4 shows beam paths of the IR radiation between the second optical device and a central and respectively an outer sensor element of the IR sensor of the IR microscope.

DETAILED DESCRIPTION

Figure 1A:
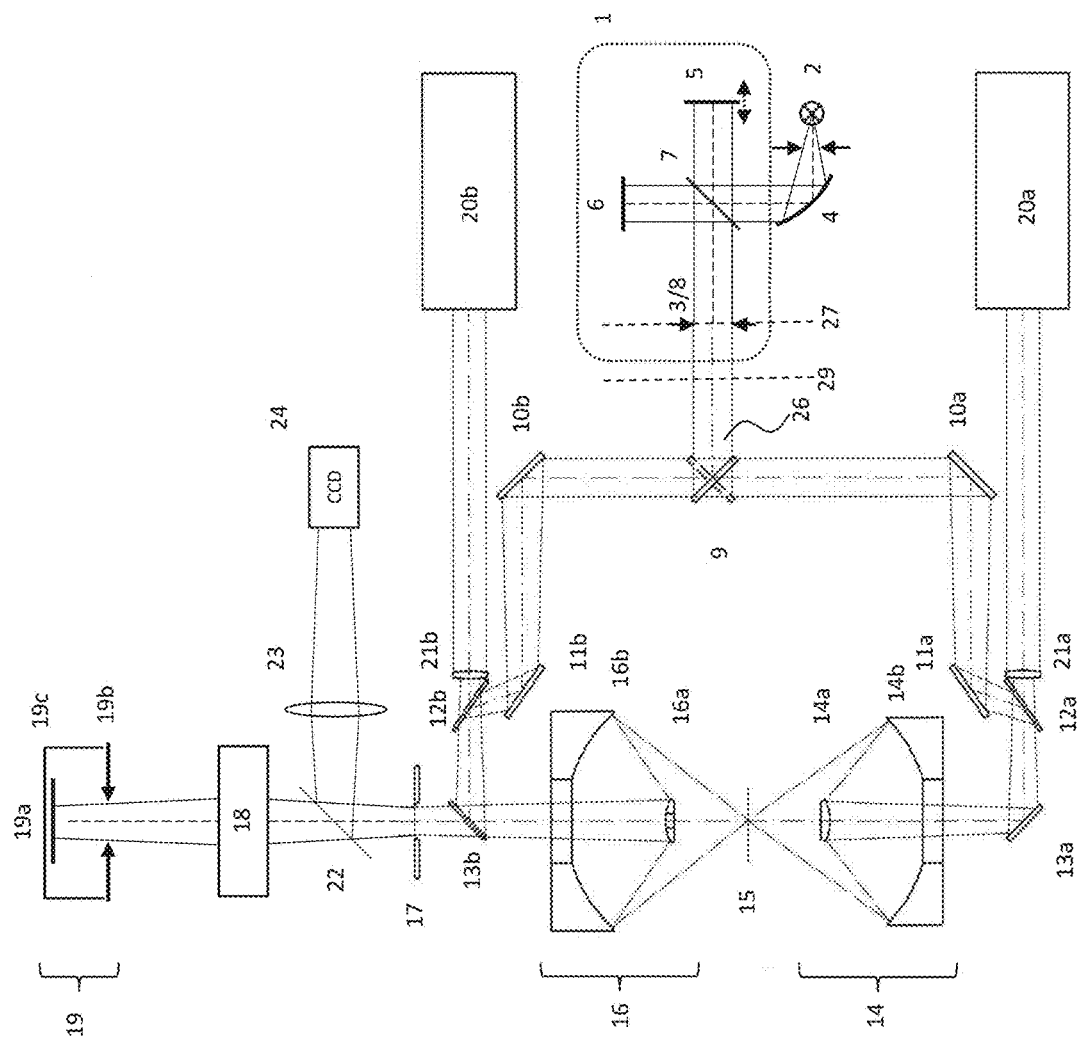
FIG. 1A shows a microscope which can be operated both in transmission and in reflection, comprising an interferometer as IR light source and the output aperture of the interferometer as effectively beam-limiting element.

A typical construction of an IR microscope which can be used both in transmission and in reflection is illustrated in FIG. 1A.

In order to generate the visual image of the sample in reflection, the light from a visual light source 20b is guided via various optical elements 21b, 12b and 13b into a microscope objective 16, which focuses the light onto a sample position 15. The reflected light from the sample is then captured again by the objective 16 and the sample (or a selected region of the sample) is imaged onto a first intermediate image plane 17. Said intermediate image plane 17 is then in turn imaged onto a CCD camera 24 via a dichroic mirror 22 and an imaging optical unit 23.

In transmission, the visual image of the sample is generated by the visible light from a light source 20a being guided via the optical elements 21a, 12a and 13a into a condenser (further objective 14), which focuses the light onto the sample position 15. The transmitted light through the sample is then imaged onto the first intermediate image plane 17 by the objective 16. Said intermediate image plane is then in turn imaged onto the CCD camera 24 via a dichroic mirror 22 and the imaging optical unit 23.

For the spectral examination of the sample with infrared radiation, the IR light from an IR radiation source 2 is modulated by an interferometer 1. The light from the radiation source 2 leaves the radiation source 2, is collimated via a mirror 4 and is guided into the interferometer 1. Here the light impinges on a beam splitter 7 and ideally 50% of said light is transmitted and 50% is reflected. The transmitted infrared light then impinges on a fixed mirror 6 and is reflected back again from the latter in the direction of the beam splitter 7. The light previously reflected at the beam splitter 7 impinges on a movable mirror 5 and is likewise reflected back again to the beam splitter 7. Both partial beams are recombined at the beam splitter 7 and leave the interferometer 1 through an output aperture 3 of the interferometer 1. The movement of the movable mirror 5 ensures that the infrared light is modulated. Besides the traditional Michelson interferometer shown in FIG. 1A, other types of interferometers can also be used as IR light source 1, for example interferometers comprising two movable mirrors having the form of retroflectors, as known from [6], for example. The modulated infrared light leaves the interferometer 1 through the exit aperture 3 thereof and is focused onto a sample in the sample position 15 with a first optical device and thus illuminates a region of the sample.

The IR beam passing between the radiation source 2 and the first optical device is referred to as "input beam". In the present example, the input beam is collimated by the mirror 4 and passes as collimated input beam 26 in the interferometer 1 and also after emerging from the interferometer 1.

The IR microscope shown in FIG. 1A can be used both in transmission and in reflection. The beam path for infrared light can be switched between transmission and reflection for this purpose.

In the reflection mode (IR-R), the first optical device comprises the objective 16 (here: Cassegrain objective having two spherical mirrors 16a and 16b) and also mirrors 9, 10b, 11b, 12b and 13b. The mirrors 9, 10b, 11b, 12b and 13b guide the infrared light modulated by the interferometer 1 into the objective 16, which focuses the infrared light onto the sample position 15 and illuminates a region of the sample.

In the transmission mode (IR-T), the first optical device comprises the further objective 14 and also mirrors 9, 10a, 11a, 12a and 13a. The mirrors 9, 10a, 11a, 12a and 13a guide the light emerging from the interferometer into the further objective 14, which focuses the infrared light onto the sample position 15 and illuminates a region of the sample. The further objective 14 can likewise be embodied as a Cassegrain objective having two spherical mirrors 14a and 14b.

It is also possible to realize the invention in IR microscopes which are provided either only for transmission measurements (in this case, the components designated with b are absent) or only for reflection measurements (in this case, the components designated with a are absent).

Light (reflected or transmitted) emanating from the sample is imaged onto an infrared detector 19 using a second optical device. For this purpose, the second optical device comprises the objective 16 and also an intermediate optical unit 18. The objective 16 images the light emanating from the sample onto the first intermediate image plane 17. A field stop can be introduced in the intermediate image plane 17, said field stop transmitting only light from a selected region of the sample position 15 and thus making it possible to select a region on the sample which is intended to be examined.

The intermediate optical unit 18 then images the first intermediate image plane 17 onto the infrared detector 19. The infrared detector 19 is preferably a two-dimensional detector comprising an IR sensor 19a and having a multiplicity of detector elements (pixels) in a sensor plane of the IR sensor 19a. Alternatively, a linear array detector can also be used, in which the sensor elements are arranged along a straight line. The IR sensor 19a is ideally cooled in order to minimize thermal excitations in the detector elements. In the example shown, the IR sensor 19a is incorporated into a detector housing 19c, which is likewise cooled. The light to be analyzed is incident in the detector housing 19c through a cooled detector stop 19b of the detector 19 and generates an image of the sample position 15 on the sensor 19a.

The size and position of the detector stop 19b determine the regions from which radiation can reach the sensor 19a of the detector 19; they thus determine the field of view of the detector 19.

Figure 6A:
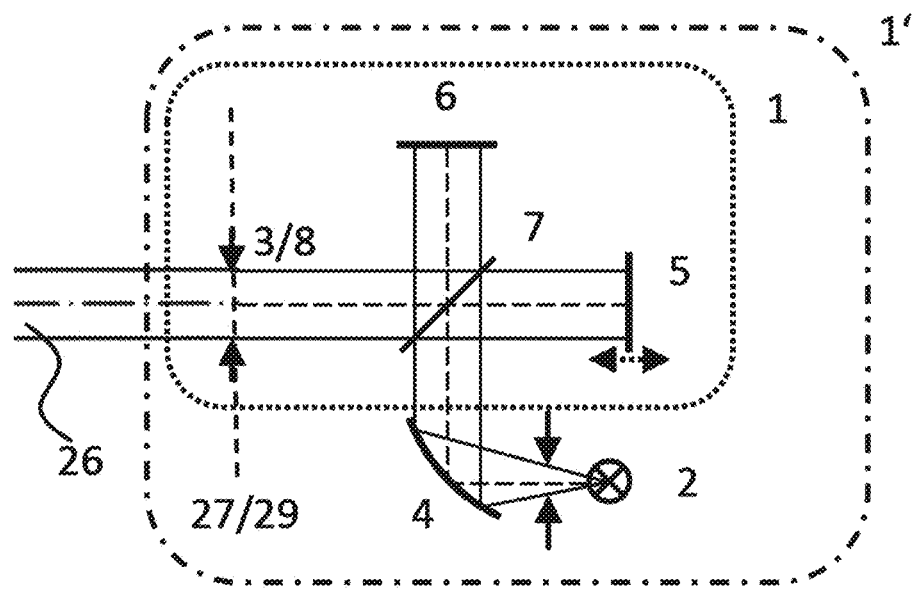
FIG. 6A shows a first embodiment of a modulated IR light source.
Figure 6B:
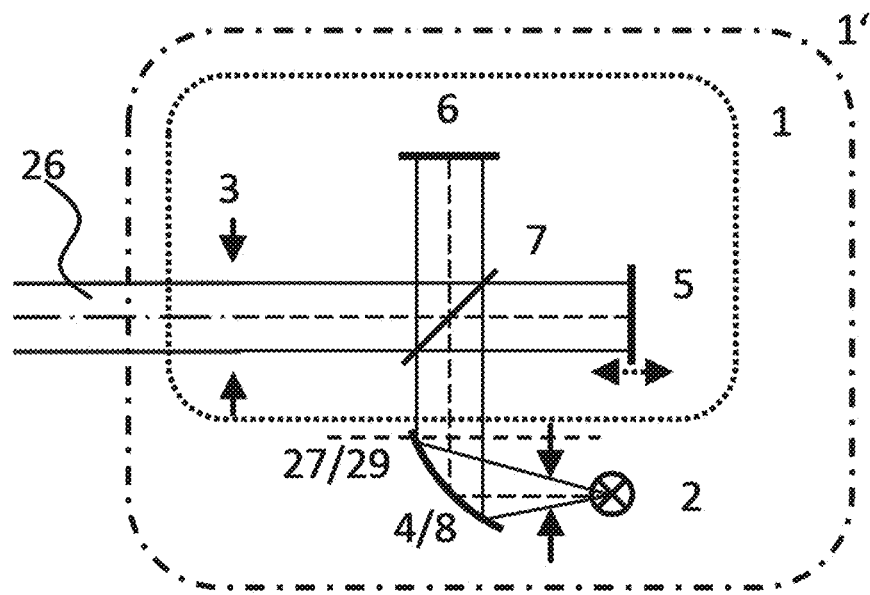
FIG. 6B shows a second embodiment of a modulated IR light source.

The IR beam is restricted by an effectively limiting element 8. This can involve optical elements (e.g. of the interferometer). According to the invention, the effectively beam-limiting element 8 is situated in the collimated input beam 26 and defines a stop plane 27. The opening/aperture (in the case of a stop) or the effective aperture (in the case of a curved mirror) of the beam-limiting element 8 determines the cross section of the input beam in the stop plane 27. In FIG. 1A and in FIG. 6A, the output aperture 3 forms the effectively beam-limiting element 8. In FIG. 6A, the effectively beam-limiting element 8 is an output aperture 3 of a modulated IR light source 1', and the input beam plane 29 is the stop plane 27. In FIG. 6B, as in FIG. 1B, the effectively beam-limiting element 8 is the mirror 4 of a modulated IR light source 1', and, again, the input beam plane 29 is the stop plane 27.

Figure 1B:
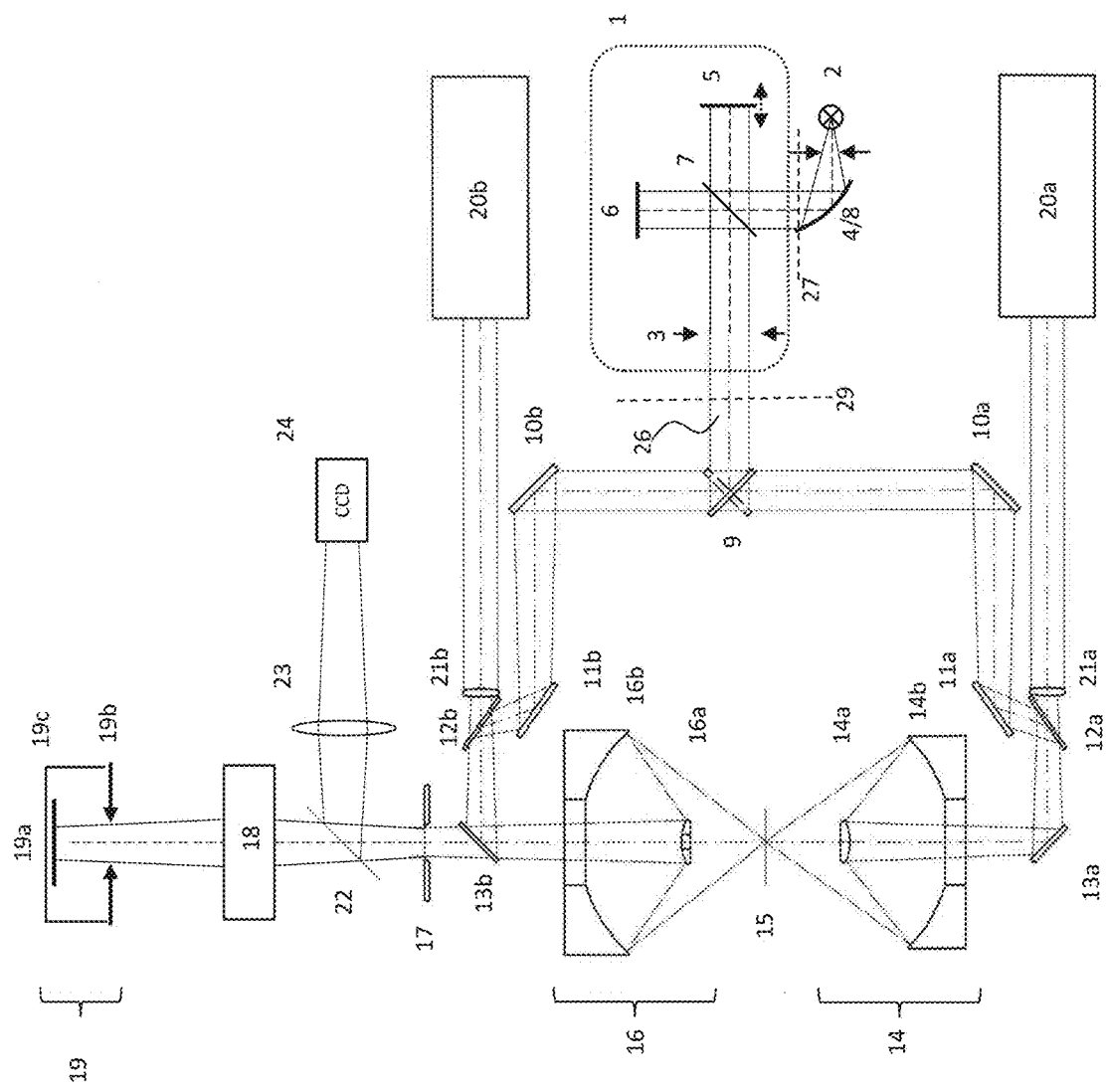
FIG. 1B shows a microscope which can be operated both in transmission and in reflection, comprising an interferometer as IR light source, wherein the effectively beam-limiting element is the collimating element.

FIG. 1B shows another embodiment of an IR microscope according to the invention, in which the collimating mirror 4, which defines the beginning of the collimated input beam and is thus situated in the collimated input beam, is the effectively beam-limiting element 8; that is to say that, in the case shown in FIG. 1B, beam limiting no longer takes place at the output aperture 3 of the interferometer 1.

Furthermore, the effectively beam-limiting element 8 can e.g., also be defined by the fixed mirror 6, the movable mirror 5 or the beam splitter 7 or it can also be situated outside the interferometer 1 between interferometer and first optical device (not illustrated).

Figures 2A, 2B:
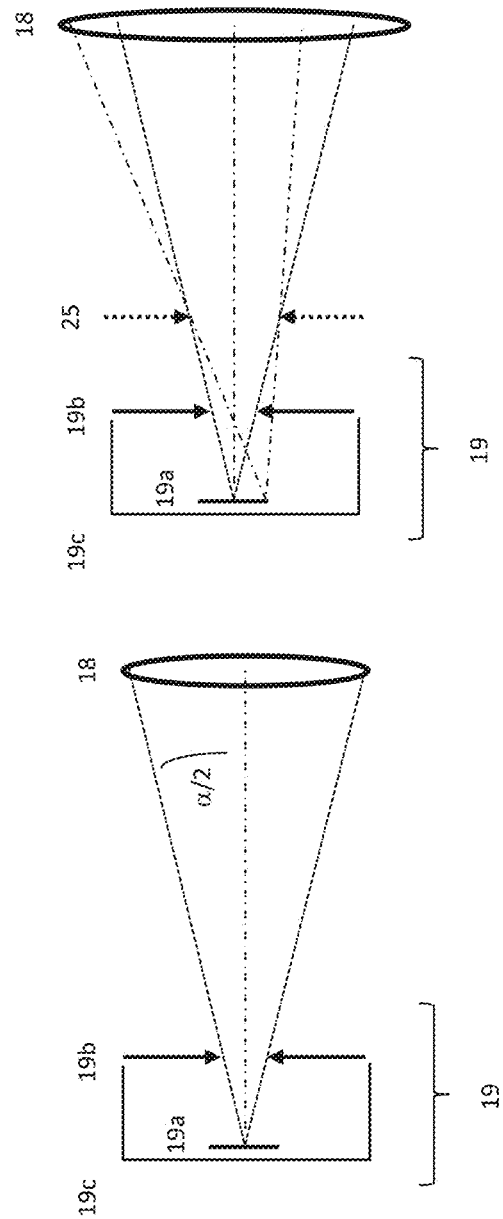
FIG. 2A shows the adaptation of the detector stop size according to the prior art under the assumption that the intermediate optical unit is beam-limiting. The setting is optimized only for the central pixel.
FIG. 2B shows the vignetting of the edge pixels that occurs if the detector stop is optimized only for the central pixel and the stop plane image 25 does not coincide with the detector stop 19*b*.

The quality of the signal detected by the IR detector depends on the illumination of the IR sensor with the IR light emerging from the interferometer and on the ambient light impinging on the sensor. According to the invention, the detector stop 19b is imaged onto an input beam plane 29 in the collimated input beam 26. The relationship between the image quality, the ratio A1/A2 and also the positions of the imaging of the detector stop is described below:

FIG. 2A shows the infrared detector 19 and the intermediate optical unit 18. By way of the intermediate optical unit 18, an image of the sample is generated (by imaging of the sample plane or of downstream intermediate image planes) on the IR sensor 19a. In the prior art, the size and position of the detector stop 19b are dimensioned such that only the radiation cone coming from the intermediate optical unit 18 upstream of the detector 19 is transmitted through the detector stop 19b.

FIG. 2B shows beam paths of the IR radiation between the intermediate optical unit 18 and the central and respectively an outer sensor element of the IR sensor 19b of the IR microscope for the case where the image of the cross section of the input beam in the stop plane (stop plane image 25) does not correspond to the size and position of the detector stop 19b. In the case of FIG. 2B, this has the consequence that radiation is vignetted on an edge pixel by the detector stop 19b since the detector stop 19b is too small to capture for all pixels the entire IR radiation emanating from the stop plane image 25. All radiation emanating from the stop plane image 25 also originates from the collimated IR source.

FIG. 2C shows the same case as in FIG. 2B, except that the detector stop 19b has been enlarged in such a way as to preclude vignetting of the IR radiation that emanates from the stop plane image 25 and reaches the edge pixels. However, the enlargement of the detector stop 19b also has disadvantages since now IR radiation that does not originate from the stop plane image 25 and thus from the collimated IR source can also impinge on the pixels. Unusable IR radiation from the surroundings can now also be incident on the detector.

FIG. 2D illustrates this substantive matter. Only the IR radiation 30 of the inner white cone passes completely through the stop plane image 25 and thus comes from the collimated IR source. The radiation in the hatched regions 31 does not come from the collimated IR source but nevertheless reaches the sensor 19a.

FIG. 2C and FIG. 2D show that there is no optimum size for the detector stop 19b as long as the stop plane image 25 does not coincide with the detector stop 19b.

FIG. 2E shows the case in which the stop plane image 25 coincides with the detector stop 19b. In this case, exclusively light that originates from the collimated IR source and thus passes through the stop plane image 25 reaches the detector. At the same time, the modulated IR light from the collimated IR source is not vignetted for any pixel on the sensor 13a.

For optimum illumination without vignetting and simultaneous suppression of ambient light, therefore, the stop plane image must correspond to the detector stop. Argued conversely, the intermediate optical unit and the size of the detector stop must be adapted such that the image of the detector stop corresponds to the cross section of the input beam in the stop plane.

Figure 3B:
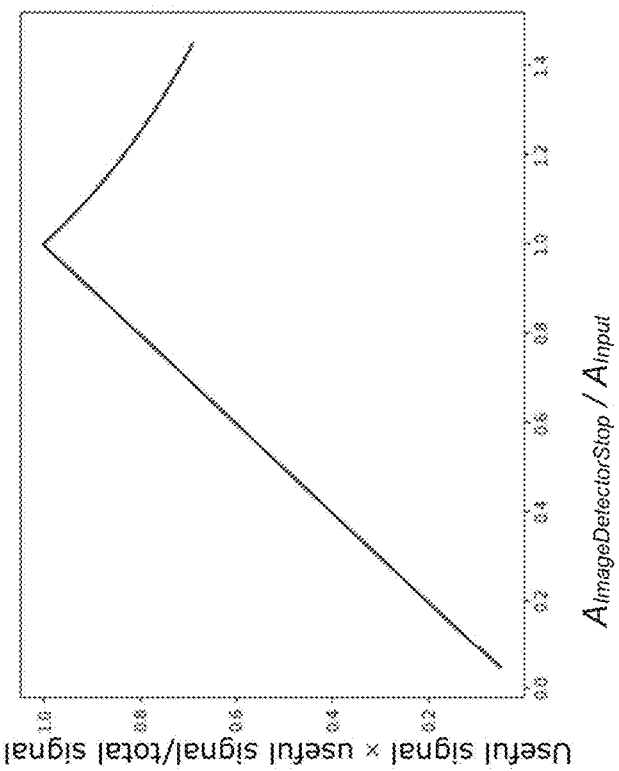
FIG. 3B shows the ratio of useful signal to total signal multiplied by the useful signal as a function of the ratio A1/A2.
Figure 3A:
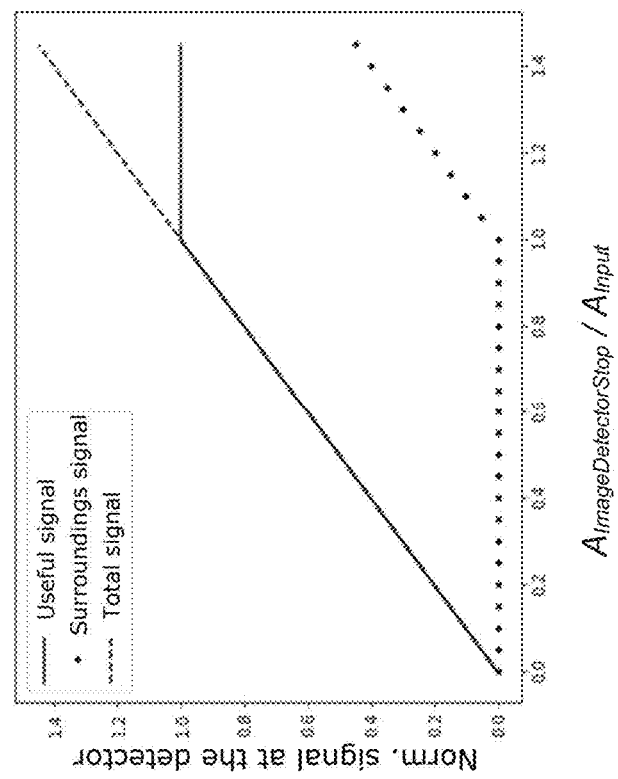
FIG. 3A shows the dependence of the total signal detected by the IR detector, of the useful signal and of the surroundings signal on the ratio A1/A2.

The dependence of the total signal detected by the IR detector, of the useful signal and of the surroundings signal on the ratio of the area A1 of the image of the detector stop opening in the input beam plane to the area A2 of the cross section of the collimated IR input beam in the input beam plane is illustrated graphically in FIG. 3A. In the case of an optimum setting, care must be taken to ensure that the detector does not become saturated. Ideally, therefore, the ratio of useful signal to total signal is as high as possible. In the range of $0 \leq A1/A2 \leq 1$, however, the ratio of useful signal to total signal is equal to 1 in a constant way. However, it is advantageous at the same time if the absolute useful signal is high. FIG. 3B therefore shows the ratio of useful signal to total signal multiplied by the useful signal as a function of A1/A2. It is clearly evident that the ratio of useful signal to total signal multiplied by the useful signal is maximal for the ratio A1/A2=1, wherein the fall in the case of smaller ratios A1/A2<1 is attributable to the shading on account of a detector stop smaller than the beam cross section to be imaged, and the fall in the case of larger ratios A1/A2>1 is attributable to the contribution of stray light from the surroundings (surroundings signal).

According to the present invention, the detector stop 19b is imaged by the first and second optical devices onto an input beam plane situated in the collimated input beam, specifically such that the area A1 of the image of the detector stop 19b in the input beam plane is maximally equal in magnitude to the area of the cross section of the collimated input beam in the input beam plane. This prevents ambient light from passing into the detector 19. According to the invention, therefore, the opening of the detector stop 19b is coordinated with the beam cross section of the collimated input beam in the input plane. In the ideal case, the detector stop 19b is imaged onto the stop plane (that is to say onto the effectively beam-limiting element 8). Stop plane and input beam plane thus coincide in this case. Conversely, this means that the opening of the beam-limiting element 8 and thus the beam cross section of the collimated input beam in the stop plane are imaged onto the detector stop 19b (stop plane image 25 is then situated in the plane of the detector stop 19b), as shown in FIG. 2E. The detector stop 19b, the second optical device 16, 18 and the effectively beam-limiting element 8 can then be coordinated with one another independently of the divergence of the input beam, such that the desired cross section of the input beam passes into the detector 19. In combination with the condition that the area A1 of the image of the opening of the detector stops 19b in the input beam plane is less than or equal to the area A2 of the cross section of the collimated IR input beam 26 in the input beam plane, it is ensured that exclusively the IR light of the collimated input beam 26 passes through the detector stop 19b. In the example shown in FIG. 2E, A1=A2, such that all light of the IR beam of the input beam plane reaches the IR sensor 19a.

According to the invention, input beam plane 29 and stop plane 27 need not necessarily correspond as long as both input beam plane 29 and stop plane 27 are situated in the collimated input beam 26 and the condition A1≤A2 is satisfied. Since the cross section of the input beam 26 in the collimated region does not change or changes only slightly, in the case of the device according to the invention the beam cross section imaged onto the detector stop 19b is always one which is equal or almost equal to the beam cross section in the stop plane 27, such that to a first approximation the beam cross section prevailing at the location of the beam-limiting element can be assumed as beam cross section in the input beam plane 27 and can be used for determining the size of the detector stop 19b. The positioning of the beam-limiting element 8 can therefore be chosen relatively freely within the collimated input beam 26, without significantly influencing the quality of the measurement. This also simplifies the design of the intermediate optical unit 18. At the same time, however, there is also the possibility of realizing a desired shading by choosing the ratio of opening of the detector stop 19b and beam limiting, e.g. if a light source 2 of very high light intensity is used (e.g. a quantum cascade laser), which would saturate the IR sensor 19a without shading and thereby render the measurements unusable.

The device according to the invention therefore offers a high flexibility in the type and positioning of the beam limiting with maximum luminous efficiency and minimization of disturbing influences.

For the design of the intermediate optical unit 18, the effective focal length f of the intermediate optical unit 18 is relevant, in particular. Said effective focal length is dependent on the distance d between detector stop 19b and IR sensor 19a and the distance x between the image 28 of the input beam plane (which is created by the first optical device and by the objective 16 of the second optical device) and the image of the sample in the intermediate image plane 17 which is created by the objective 16 of the second optical device (FIG. 4):

$$f = \frac{d \cdot x}{x \cdot m - d/m},$$

such that, firstly, the sample arranged in the sample position 15 is imaged onto the IR sensor 19a and, secondly, the input beam plane situated in the collimated input beam is imaged onto the detector stop 19b.

Figure 5:
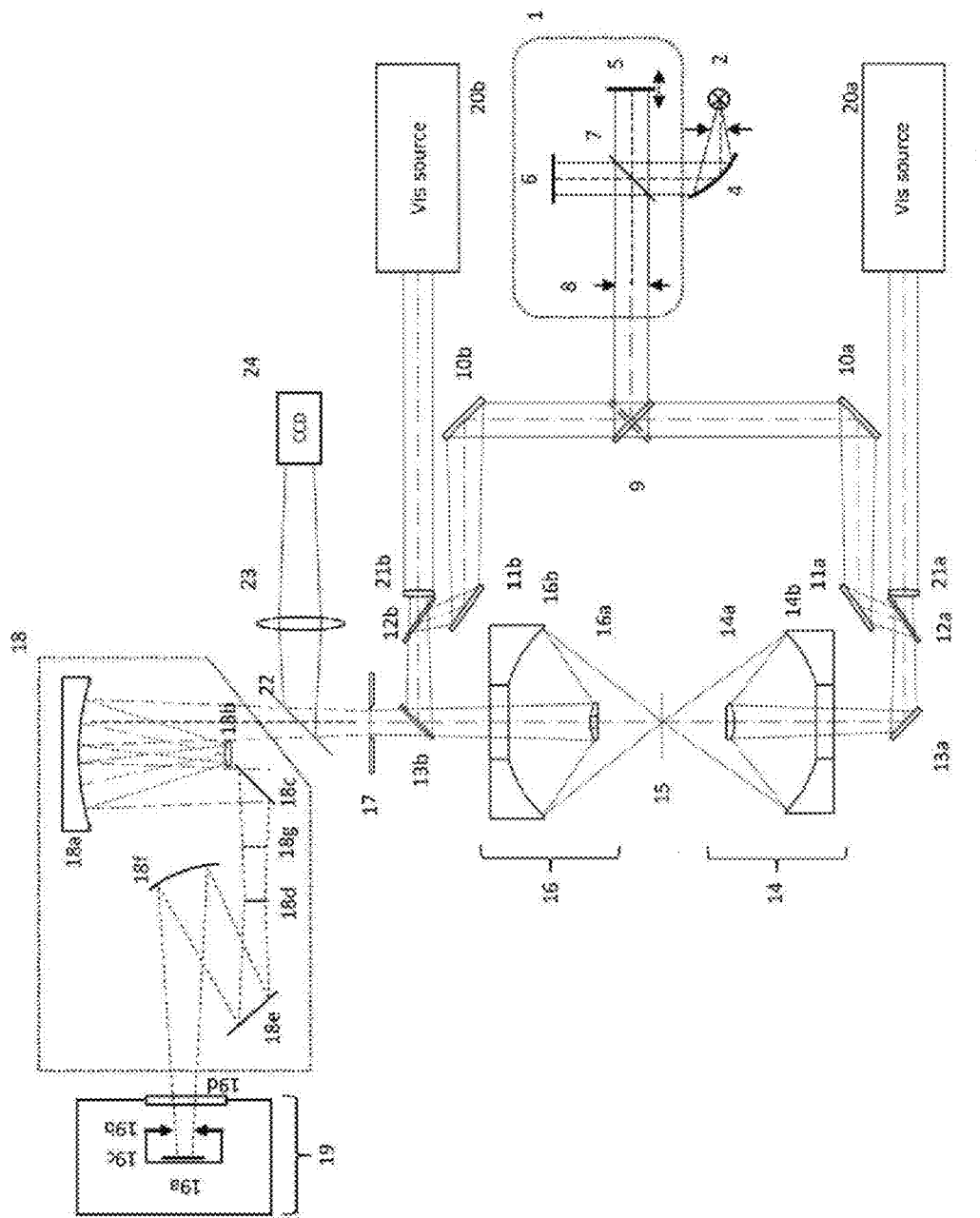
FIG. 5 shows the IR microscope from FIG. 1 with a detailed illustration of the intermediate optical unit.

FIG. 5 shows how the intermediate optical unit 18 can be embodied for example. The intermediate optical unit 18 here comprises a 1× objective according to Offner [5], which produces an astigmatism-free imaging 18d of the intermediate image plane 17 by way of two spherical mirrors 18a and 18b. A plane mirror 18c serves merely for beam deflection. The 1× objective according to Offner serves to generate an image of the sample at a location in the microscope in the vicinity of which there is enough space for the cooled area detector 19. The IR detector 19 is usually cooled with liquid nitrogen by way of a Dewar vessel. Alternative systems have, for example, Stirling coolers for producing the low temperatures required at the sensor element. All these detectors need a comparatively large amount of space. In addition, in the case of the Dewar vessel, the filling opening for the liquid nitrogen has to be accessible from the outside. Besides the image of the sample 18d, the 1× objective according to Offner also generates an image 18g of the input beam plane 29. A downstream optical unit comprising plane mirror 18e for beam deflection and mirror 18f is configured such that an image of the sample image 18d is generated on the sensor 19a of the detector 19 and at the same time an image of the input beam plane image 18g is generated on the cold stop 19b of the detector 19. For this purpose, the focal length f of the mirror 18f is firstly determined by way of the above-described equation $$f = \frac{d \cdot x}{x \cdot m - d/m}$$

Since the mirror 18f effects an off-axis imaging, firstly it is advantageous to minimize the deflection angle; secondly, the use of a toroidal mirror having focal lengths f and f' instead of a spherical mirror having the focal length f determined is advantageous for the image quality. f' can be determined from f and the deflection angle. Said toroidal mirror can subsequently still be altered easily in terms of its shape. Optimum surface shapes that result in an optimized image quality on the sensor of the detector can be determined here with ray tracing programs (e.g. Zemax). The surface of the mirror 18f then deviates slightly from the ideal toroidal shape; a toroid-like mirror arises. The light coming from the mirror 18f passes through a window 19d of the detector, generates an image of the input beam plane 29 at the detector stop 19b and an image of the sample on the sensor 19a of the detector 19.

LITERATURE LIST

[1] U.S. Pat. No. 7,440,095
[2] DE 10 2012 200 851 B3
[3] U.S. Pat. No. 7,378,657 B2
[4] Bruker Optik GmbH "HYPERION Series: FTIR Microscopes"
[5] DE 2 230 002 C2
[6] DE 19 704 598 C1

LIST OF REFERENCE SIGNS

1 IR light source/interferometer
1' Modulated light source
2 Radiation source
3 Output aperture of the interferometer 1
4 Mirror of the interferometer 1
5 movable mirror of the interferometer 1
6 fixed mirror of the interferometer 1
7 Beam splitter of the interferometer 1
8 effectively beam-limiting element
9 Mirror
10a Mirror for measurement in transmission
10b Mirror for measurement in reflection
11a Mirror for measurement in transmission
11b Mirror for measurement in reflection
12a optical element for measurement in transmission 12b optical element for measurement in reflection
13a optical element for measurement in transmission
13b Beam splitter optical unit
14 Condenser/further objective
15 Sample position
16 Objective
17 first intermediate image plane
18 Intermediate optical unit
18a, 18b Offner objective/spherical mirrors
18c Plane mirror
18d Image of the sample in intermediate optical unit 18
18e Plane mirror
18f Mirror
18g Image of the sample in input beam plane in intermediate optical unit 18
19 IR detector
19a IR sensor
19b Detector stop
19c Detector housing
20 visual light source for measurement in transmission
20b visual light source for measurement in reflection
21a optical element for measurement in transmission
21b optical element for measurement in reflection
22 dichroic mirror
23 Imaging optical unit
24 CCD camera
25 Image of the stop plane
26 collimated input beam
27 Stop plane
28 Image of the input beam plane upstream of intermediate optical unit 18
29 Input beam plane

What is claimed is:

1. An infrared (IR) microscope comprising
an IR light source configured to generate a collimated IR input beam,
an effectively beam-limiting element in a stop plane in the collimated IR input beam,
a sample position for supporting a sample,
an IR detector having an IR sensor,
a detector stop having a detector stop opening, wherein the detector stop is arranged upstream of the IR sensor,
a first optical device configured to focus the collimated IR input beam generated by the IR light source onto the sample position, and
a second optical device configured to image the sample position onto the IR sensor, wherein the second optical device comprises an objective and an intermediate optical unit,
wherein the effectively beam-limiting element is situated in the collimated IR input beam upstream of the first optical device, and the first optical device and the second optical device are situated to image the detector stop opening of the detector stop into an input beam plane, and wherein, for an area A1 of an image of the detector stop opening in the input beam plane and an area A2 of a cross section of the collimated IR input beam in the input beam plane:

$0 < A1/A2 \leq 1$.

2. The IR microscope as claimed in claim 1, further comprising a further objective, configured to focus the collimated IR input beam onto the sample position.

3. The IR microscope as claimed in claim 1, wherein the objective is also comprised by the first optical device and is configured to focus the collimated IR input beam onto the sample position, and wherein the IR microscope further comprises a beam splitter optical unit configured to couple the collimated IR input beam generated by the IR light source into the objective.

4. The IR microscope as claimed in claim 1, wherein the detector stop and the IR sensor are situated within a common detector housing and are arranged at a distance d away from one another.

5. The IR microscope as claimed in claim 4, wherein the distance d is a maximum of 50 mm.

6. The IR microscope as claimed in claim 1, wherein the intermediate optical unit has an effective focal length f for which:

$$f = \frac{d*x}{x*m - d/m}$$

where
f: effective focal length of the intermediate optical unit
x: distance between the image of the detector stop opening in the input beam plane that is created by the first optical device and by the objective of the second optical device and an image of the sample that is created by the objective of the second optical device
d: distance between the detector stop and the IR sensor
m: magnification factor of the intermediate optical unit.

7. The IR microscope as claimed in claim 6, wherein the magnification factor m of the intermediate optical unit is m=1.

8. The IR microscope as claimed in claim 1, wherein the effectively beam-limiting element is an output aperture of the IR light source.

9. The IR microscope as claimed in claim 1, wherein the effectively beam-limiting element and the input beam plane are arranged within the IR light source.

10. The IR microscope as claimed in claim 1, wherein the input beam plane is the stop plane.

11. The IR microscope as claimed in claim 1, wherein the intermediate optical unit comprises an Offner objective.

12. The IR microscope as claimed in claim 1, wherein the IR light source comprises an interferometer, a quantum cascade laser or a Fourier-transform infra-red (FTIR) spectrometer.

* * * * *